No. 621,108. Patented Mar. 14, 1899.
G. B. LEONARD.
REPAIRING DEVICE.
(Application filed Oct. 27, 1898.)
(No Model.)
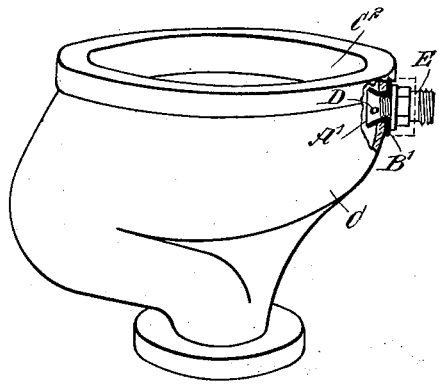
FIG.1.
FIG.2.
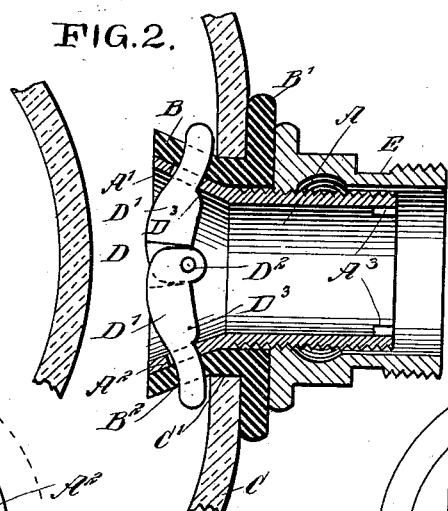
FIG.4.
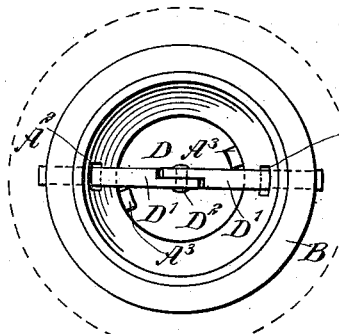
FIG.5.
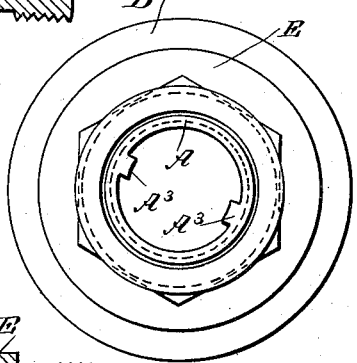
FIG.3.
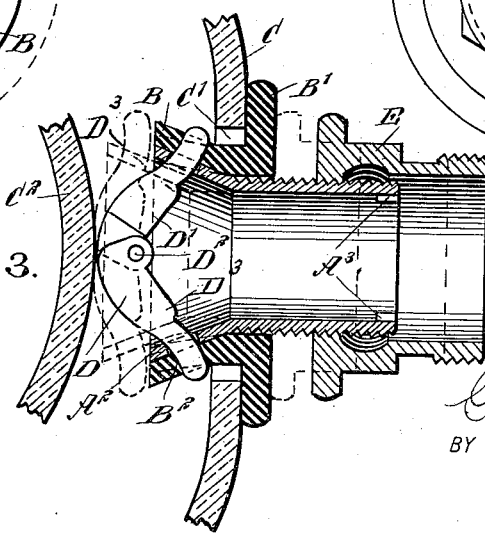
WITNESSES:
Donn Twitchell
Geo. G. Hosler
INVENTOR
G. B. Leonard
BY
[signature]
ATTORNEYS.

UNITED STATES PATENT OFFICE.

GEORGE B. LEONARD, OF CHICAGO, ILLINOIS.

REPAIRING DEVICE.

SPECIFICATION forming part of Letters Patent No. 621,108, dated March 14, 1899.

Application filed October 27, 1898. Serial No. 694,703. (No model.)

*To all whom it may concern:*

Be it known that I, GEORGE B. LEONARD, of Chicago, in the county of Cook and State of Illinois, have invented a new and Improved Repairing Device, of which the following is a full, clear, and exact description.

The object of the invention is to provide a new and improved repairing device more especially designed for use on water-closet bowls and arranged to permit of conveniently and quickly connecting the water-supply pipe with the bowl in case the earthenware water-inlet is broken off.

The invention consists of novel features and parts and combinations of the same, as will be fully described hereinafter and then pointed out in the claims.

Figure 1 is a perspective view of a bowl with the repairer applied, parts being in section. Fig. 2 is an enlarged sectional plan view of the same. Fig. 3 is a similar view of the same with parts in a different position. Fig. 4 is an inner end view of the improvement, and Fig. 5 is an outer end view of the same.

The improved repairing device is provided with a tubular thimble A, formed at one end with an outwardly-flaring flange A', on which fits one end of a rubber gasket B, provided at its other end with a flange B', adapted to abut or rest against the outer face of the wall C of the water-closet bowl, as is plainly illustrated in Figs. 1, 2, and 3. A coupling D is carried on the flange A' of said thimble, and said coupling consists of two links D', pivotally connected with each other at $D^2$ and extending in opposite directions through registering apertures A' and $B^2$, formed in the flange A' and the gasket B, as plainly indicated in the drawings.

On the outer threaded end of the thimble A screws a coupling-nut E, of any approved construction, adapted to abut against the flange B' of the gasket and to make connection with the usual union-coupling employed for connecting the nut with the water-supply pipe. The thimble A is also provided on the inside of its outer end with lugs $A^3$, adapted to be taken hold of by a suitable tool to prevent the thimble from turning while screwing up the coupling-nut E.

In using the device the coupling D is in nearly a closed position, as indicated in Fig. 3, to permit of passing the flange $A^3$, the gasket B, and said coupling D through the opening C' in the wall C of the bowl, the middle or pivot portion of said coupling finally striking against the rim $C^2$, formed on the inside of the bowl, to cause the links D' to open up or straighten out, as indicated in dotted lines in Fig. 3. When the several parts are in this position and the coupling-nut E is now screwed up and the thimble A is held stationary by a tool engaging the lugs $A^3$, then said thimble is drawn outwardly by the nut abutting against the flange B' of the gasket and pressing said flange firmly in contact with the outer face of the wall C. When the links D' are straightened out and cannot open any farther, their free ends project beyond the gasket-surface and abut against the inner face of the wall C, as plainly indicated in Fig. 2. Thus when the nut E is finally screwed up the repairer is securely fastened in place on the wall C of the bowl and at the same time the gasket B has securely closed the opening C' to prevent leakage of the water at this point.

The links D' of the coupling D are provided with shoulders $D^3$, adapted to butt against the inner surface of the flange A' of the thimble A to prevent accidental shifting or displacement of the coupling in the thimble.

It is understood that this device serves to make ready connection with the water-supply pipe in case the spout or inlet for the bowl is broken off.

The device is very simple and durable in construction, is not liable to get out of order, and is readily applied on a bowl, as described.

Having thus fully described my invention, I claim as new and desire to secure by Letters Patent—

1. A repairer of the class described, comprising an externally-threaded thimble formed with a flaring flange at its inner end, a gasket fitting the thimble at said flange, and having a flange adapted to be seated on the outer face of the wall of a bowl, a coupling made in two links hinged together, and extending through registering openings in said flange and said gasket, to abut against the inner face of the wall of the bowl, and a coupling-nut screwing on said thimble, to draw the latter outward and press the gasket-flange in firm contact with the wall of the bowl, substantially as shown and described.

2. A repairer of the class described, comprising an externally-threaded thimble formed with a flaring flange at its inner end, a gasket fitting the thimble at said flange, and having a flange adapted to be seated on the outer face of the wall of a bowl, a coupling made in two links hinged together, and extending through registering openings in said flange and said gasket, to abut against the inner face of the wall of the bowl, a coupling-nut screwing on said thimble, to draw the latter outward and press the gasket-flange in firm contact with the wall of the bowl, and lugs on the inside of the thimble to hold the latter against rotation when screwing up the nut, substantially as shown and described.

3. The combination of a thimble provided with a flaring inner end adapted to carry an elastic gasket on its inner side, a coupling-nut threaded on the outer end of the thimble, the coupling-nut working with the flared end of the thimble to expand the gasket, and a coupling having two pivotally-connected links, both links projecting through openings in the flared end of the thimble, such coupling serving to act with the coupling-nut to hold the thimble and gasket in place.

4. The combination of a thimble having a flaring inner end, means carried on the outer portion of the thimble for drawing the thimble outwardly, and a coupling comprising two pivotally-connected links extended loosely through the flared portion of the thimble, the coupling serving to limit the outward movement of the thimble.

GEORGE B. LEONARD.

Witnesses:
JOHN J. PIERSKI,
FOLLETT W. BULL.